June 5, 1962  J. P. M. DAUDIN ETAL  3,037,867
METHOD OF PRESERVING BANANA PLANTS
Original Filed May 22, 1959

INVENTORS
Jacques Daudin
Cornelius C. Smith

By *Charles A. Huggett*
Attorney

United States Patent Office 3,037,867
Patented June 5, 1962

3,037,867
METHOD OF PRESERVING BANANA PLANTS
Jacques Pierre Marie Daudin, Fort de France, Martinique, French West Indies, and Cornelius C. Smith, Lynbrook, N.J., assignors to Socony Mobil Oil Company, Inc., a corporation of New York
Original application May 22, 1959, Ser. No. 815,058. Divided and this application July 1, 1960, Ser. No. 40,368
5 Claims. (Cl. 99—168)

This invention relates to compositions containing wax in emulsified form found suitable for use in protecting fruit. The invention is specifically directed to a material useful for coating bananas and banana plants during the growth of the banana or for a coating upon the banana bunches during shipment of the bananas.

The banana probably was one of man's first foods, and one of the first to be cultivated. Banana growth requires a tropical climate. Temperatures should not go below 50° F., and seldom above 105° F. If rainfall is not frequent and scattered, irrigation is required. The banana plant grows best in a fertile, well drained soil, and when protected from hot winds and hurricanes.

The banana market is primarily located in the temperate zones and hence long storage of this tropical fruit in transit to distant markets is required. Loss of weight due to evaporation of moisture is a substantial factor in reducing the volume of marketable fruit at the market, and spoilage because of disease, premature ripening of the fruit are also important factors tending to reduce the volume of marketable product.

A disease called "banana leaf spot disease" or "sigatoka" has profoundly altered banana production during recent years. "Sigatoka" damages the leaves of the banana plant. This indirectly affects the fruit. Mature bunches fall and fail to ripen. Or, if the bunches are nearly mature when the disease strikes, the fruit may have normal flavor, but it will be undersized and unmarketable. The economic effect of "sigatoka" has been extensive and, until methods for control were found, devastating.

Banana leaf spot was first recorded in 1902 in Java. In 1913 it was found on bananas in the Sigatoka Valley of the Fijis. Within a few years this disease reduced Fijian banana production from 1,300,000 to 100,000 stems. In 1925 it invaded Australia; and then it devastated plantations in Siam, China and Malaya. It reached the Western Hemisphere in 1934, striking at Surinam and Trinidad. The Republic of Honduras, which had produced 27 million stems in 1930, and 19 million in 1934, produced only 13 million stems in 1935 after sigatoka invaded in 1934. Sigatoka soon appeared in Guatemala, Mexico, Cuba, Haiti, Jamaica, Costa Rica, Panama, Colombia, Martinique and Guadeloupe. Sigatoka hit Mexico in 1937 and production fell from 23 million stems to 13 million in 1940 and 1.8 million in 1955. By 1940 Cuba's banana production was almost wiped out. Practically all banana-producing areas in the world have been invaded by now.

The first successful experiments in sigatoka control were started in Honduras in 1935. Lime-sulfur solution, Bordeaux, copper sulfate and other materials were tried in sprays; and sulfur, lime-sulfur, copper-lime and anhydrous copper sulfate dusts were tried. A Bordeaux mixture and lime-sulfur emerged as giving positive control. Then, during the rainy months, all sprays and dusts except Bordeaux failed completely. Bordeaux mixture thus was depended upon to stem the onslaught of sigatoka until more economical control methods could be developed.

This mixture is applied as an aqueous spray which coats the leaves of the plant and prevents the spread of the disease. Because of the mechanism by which the banana plant grows, i.e., the formation of a new leaf approximately every ten to twelve days, frequent spraying is required to effectively control sigatoka. However, in practice these sprays are applied at the rate of approximately 200 gallons per acre at fourteen to twenty-eight day intervals. The exact number of applications per year depends upon climatic conditions prevailing in any specific area. A rule of thumb figure frequently used with Bordeaux mixture is twenty sprayings per year.

Until 1954, Bordeaux mixture (prepared by mixing together a dilute solution of copper sulfate and milk of lime) was the primary means of sigatoka control. However, in 1954 oil-copper fungicide sprays were found effective in controlling the disease in Ecuador and Guadeloupe. These oil base sprays were given preference over Bordeaux mixture by banana growers because they are cheaper and easier to apply. The oil-copper fungicide spray can be applied by a knapsack sprayer carried on the back of a workman to the point of application. The oil-copper fungicide spray can be also applied by aircraft.

On the other hand, Bordeaux mixture, which requires so much more liquid per unit of area, can be applied only from stationary spraying systems through miles of pipes or from mobile spraying trucks in some instances. When using the trucks, the roadways for the trucks must be built into the plantation and hence reduce the usable acreage. Furthermore, the roads must be well ballasted to insure passability during the periods of heavy rainfall encountered in these tropical climates. In some plantations where the terrain is hilly, use of this system of applying the spray is impractical.

Specially refined oils without copper have been found effective and hence seem more attractive to the banana grower than Bordeaux mixture. However, such oils at times have been found to burn the plants seriously and this defect develops to a more serious extent as continuous applications of oil are made. While considerable experimentation has been conducted to relieve this problem, no completely satisfactory improvement in the oil has been made. The value of the crop produced from the plants damaged by the oil spray is materially impaired and hence an economical substitute for the oil spray is earnestly desired.

Wax emulsions containing a variety of fungicides have been sprayed on the leaves of trees in the past as a means of disease control. These emulsions have not been successful in part because they failed to insure adequate coverage of the leaf area. Wax has been applied to the exterior of fruit to prevent moisture loss and rot or damage in transit but this has failed to accomplish the desired result. It appeared that in these instances breathing of the fruit was so impaired that the fruit was badly damaged or ruined. In other instances, little or no improvement was noted because of failure to adequately provide complete coverage.

We have successfully developed a wax emulsion which can be blended with a suitable fungicide and applied to fruit, particularly bananas, or to the banana leaves to keep the plants healthy during growth and the fruit healthy during transit. While some reduction of moisture loss is effected by spraying the plants prior to picking the fruit, substantial improvement is obtained by dipping the fruit in a bath of the emulsion-fungicide vehicle after picking and prior to shipment. This bath also gives the fruit improved disease control during shipment and is particularly effective in reducing or eliminating stem rot.

An object of this invention is to develop a suitable wax-containing fungicide vehicle capable of being coated on fruit plants or fruit, such as bananas, to provide protection against disease.

A further object of this invention is to provide a suitable wax-containing fungicide composition which can be applied economically to bananas or banana plants to control diseases such as sigatoka and stem rot.

A further object of this invention is to provide a suitable wax emulsion containing a compatible fungicide having improved spreading and sticking characteristics permitting application of the emulsion mixture to bananas and banana plants.

A further object of this invention is to provide a dipping solution which provides disease control to bananas, retards maturation and reduces weight loss in transit.

A further object of this invention is to provide a wax emulsion containing a compatible fungicide adapted for spraying on the leaves of banana plants from knapsack or aircraft sprayers to effectively control sigatoka.

A further object of this invention is to provide a suitable wax emulsion which is sufficiently stable to permit shipment with rough handling over long distances with wide variations in temperature and which is adapted to make compatible blends by simple dilution with water and mixing with a fungicide for spray or dipping application to bananas or their plants.

These and other objectives will be disclosed in the following detailed discussion of the invention and also in the attached figures.

Figure 1:
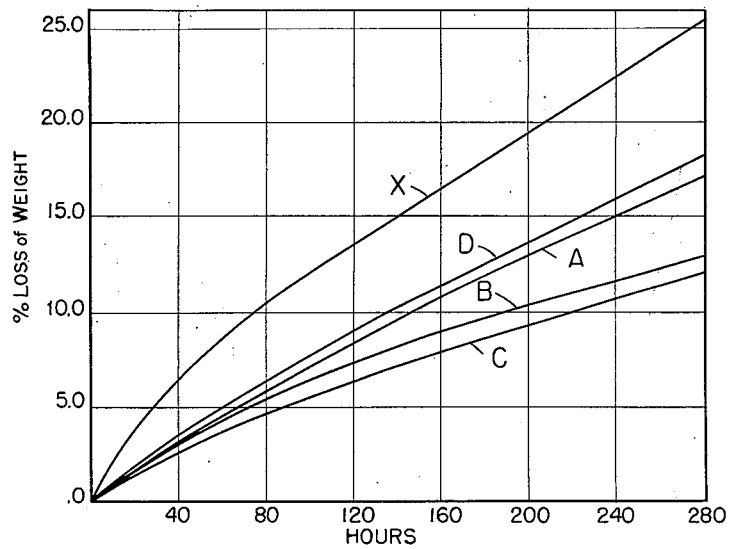
FIGURE 1 is a plot of percent weight loss in bananas versus hours under greenhouse test conditions of variable temperature and humidity.

The invention may be illustrated by blending paraffin wax, microcrystalline wax, petrolatum, a critical proportion of a water-soluble, non-ionic emulsifier balanced with a critical proportion of an oil-soluble, non-ionic emulsifier and a substantial volume of water. The addition of a small amount of sodium nitrite is found to provide improved qualities to the product. Homogenization of the mixture to reduce the wax to a very fine particle size is needed to provide storage and transport facility. This composition in emulsified form blends readily with many useful fungicides, additions of a salicylanilide fungicide or a copper oxychloride fungicide being particularly preferred.

Paraffin wax is the common article of manufacture obtained from petroleum oil by distillation or solvent action and sold generally as wax cakes having a melting point of about 115–150° F. This wax is made up of high molecular weight hydrocarbons, being generally straight chain compounds having a crystalline structure in solid form.

Microwax or microcrystalline wax is a distinct form of wax obtained from petroleum oil by distillation or fractional crystallization using selected solvent. This material has a melting or softening point of about 150–190° F. and contains a substantial portion of high molecular weight hydrocarbons having branched-chain and ring structures. The material is far more plastic than paraffin wax, being amorphous in form and lacking a well defined crystalline structure.

Petrolatum is a common article of commerce obtained from petroleum and largely contains paraffin wax with a substantial amount, such as up to 30–40%, oil.

Many non-ionic emulsifiers can be used in this invention provided the critical relationship between oil solubility and water solubility is maintained. Typical of acceptable emulsifiers are polyoxyethylene ethers of t-octyl phenol having variable amounts of ethylene oxide content per mol of finished product required to provide the oil and water solubility characteristics. For example, a portion of polyoxyethylene ethers of t-octyl phenol having about 5 mols of ethylene oxide per mol of finished product when blended with a like amount of polyoxyethylene ethers of t-octyl phenol having about 10 mols of ethylene oxide per mol of finished product provides an emulsifier combination having the desired water and oil solubility. As the ethylene oxide content is reduced, oil solubility is enhanced, whereas as the ethylene oxide content is increased, water solubility is enhanced. Obviously a blended product could be supplied having sufficient oil-soluble and water-soluble constituents and possessing an average ethylene oxide content to mol of finished product between about 5 and 10 which would be satisfactory. This is contemplated as within the scope of this invention. Suitable emulsifiers of this type may be obtained from commercial sources under the trade names Triton X-45 and Triton X-100. Other non-ionic emulsifiers are contemplated as within the scope of this invention. Typical are partial esters of common fatty acids (palmitic, stearic, oleic, etc.) and hexitol anhydrides (hexitans and hexides) derived from sorbitol. These materials, to which polyoxyethylene chains have been added to the non-esterified hydroxyls to increase water solubility, are blended with the untreated material to provide solubility balance. Characteristic of these materials are the Spans and Tweens manufactured and sold commercially. Also usable are the condensation product of ethylene oxide and a rather high molecular weight polypropylene glycol. The molecular weight of the polypropylene glycol portion may be 1000–2000. The molecular weight of the compound may be as high as 8000. Typical of this class of compounds are the Pluronics manufactured and sold commercially.

The following Table I shows a variety of commercially available products of the water-soluble and oil-soluble emulsifiers defined generally as alkylated aryl polyether alcohols.

TABLE I

| Product Trade Name | Made from— | Approx. Mol Ethylene Oxide |
|---|---|---|
| Triton X-45 | t-octyl phenol | 5 |
| Renex 648 | nonyl phenol | 5 |
| Hyonic PE-50 | t-octyl phenol | 5 |
| Igepal CO-430 | nonyl phenol | 4 |
| Tergitol NP-14 | do | 4 |
| Triton X-100 | t-octyl phenol | 9–10 |
| Igepal CA-630 | do | 9–10 |
| Hyonic PE-100 | do | 9–10 |
| Poly-tergent G-300 | do | 10 |
| Renex 690 | nonyl phenol | 10 |
| Igepal CO-710 | do | 10–11 |
| Nopco 1528-B | do | 10–11 |

While in the preferred emulsion the three types of wax, paraffin, microcrystalline and petrolatum are blended, any one or two of these waxes may be used with satisfactory results. As a broad definition the desired composition contains the following proportions of constituents shown in Table II.

TABLE II

| Materials | Broad Range, percent by weight | Preferred Range, percent by weight |
|---|---|---|
| Paraffin Wax | 0–47.5 | 15–30 |
| Microcrystalline Wax | 0–47.5 | 5–20 |
| Petrolatum | 0–25 | 10–15 |
| Oil-Soluble, Non-Ionic Emulsifier | 0–5.0 | 1–3 |
| Water-Soluble, Non-Ionic Emulsifier | 1–5 | 2–4 |
| Water | Balance | Balance |

The total wax content of the emulsion should be broadly about 10–70% and preferably about 30–50%. The non-ionic emulsifiers in the total blend should be broadly about 2–10% and preferably about 3–7%. The balance to 100% should then be water although minor amounts of additional material may be added for specific purposes.

The specified ingredients are mixed and heated above the melting point of the wax. The mixture is then passed through a high pressure homogenization treatment to reduce the wax particle size to 2 or 3 microns or less. This may be obtained by the use of a Manton-Gaulin homogenizer or a De Leval homogenizer. It is noted in Table II that the broad range of oil-soluble emulsifier is from 0–5% by weight. The oil-soluble emulsifier may be reduced to very low amounts or to zero in the case of the more selective water-soluble emulsifiers. However, most emulsifiers require at least a small amount of the oil-soluble emulsifier to provide the necessary stability. It is recognized that the water-soluble emulsifiers will have varying degrees of solubility in oil, and hence those water-soluble emulsifiers having the lowest oil solubility will require more of the oil-soluble emulsifier whereas those water-soluble emulsifiers showing the greatest oil solubility will require less of the oil-soluble emulsifier and can in certain instances be used without an oil-soluble emulsifier being present, although a mixture of the two types of emulsifiers is often required and generally preferred. When the water-soluble emulsifier has fairly good oil solubility, it can serve as both the oil-soluble and water-soluble emulsifier but must be used in high concentration to provide any reasonable amount of oil solubility, viz. 4–5%.

A suitable petrolatum is Waxrex 00, having the following characteristics:

Color—ASTM (American Society for
  Testing Materials) _____ 4 maximum.
Melting point, ASTM _____ 115–125° F.
Penetration, ASTM cone @ 77° F. __ 155–175.

A suitable microwax is Mobilwax 2305, having the following characteristics:

Color—ASTM _____ 2 maximum.
Melting point, ASTM _____ 160° F. minimum.
Penetration, ASTM needle @ 77° F. _____ 22–32.

The emulsion prepared in accordance with the information given above is adequate for shipment and will remain stable indefinitely. However, as a particular feature of this invention to improve the mechanical storage stability of the emulsion a small amount of sodium nitrite is added, such as 0.1–0.5% of the total weight of the composition. Under severe and continuous mechanical agitation in transport, a small amount of the wax may tend to separate from the emulsion. This is noted in a decrease of fluidity in the emulsion and a formation of some semi-solid material of a cream cheese consistency. This can readily be demonstrated by placing 75 cc. of the emulsion in a 4 ounce sample bottle and by reciprocating the bottle vigorously in an axial direction of 1.5 inches for about 30 minutes at room temperature at a rate of about 250–300 complete cycles per minute. The material is seen to be no longer fluid and has a cheese-like consistency. The addition of about 0.2% sodium nitrite to the emulsion followed by similar agitation demonstrates the effectiveness of this agent in suppressing separation since the emulsion is seen to be free-flowing and stable following agitation. This test is far more severe than the conditions normally encountered in service. In addition to providing mechanical stability, the sodium nitrite is a rust inhibitor and prevents rusting of the drums or containers used to transport the emulsion.

We have found that the emulsions of this invention can be substantially cut back with water, preferably on the plantations. For example, the emulsion may be used at a strength of about 5–10% of the finished blend, the rest being added water. Stronger solutions are effective for spraying or dipping without serious damage to the fruit. However, since adequate protection is obtained at 5–10% solutions, such mixtures will generally be used for purposes of economy. At this time a suitable fungicide is added to the mixture with agitation to insure thorough distribution. Various materials may be utilized such as ferric dimethyl dithiocarbamate, zinc dimethyl dithiocarbamate, n-trichloromethylthiotetrahydrophthalimide, tetramethyl thiuram disulfide, 2-hepadecyl glyoxalidine acetate, manganese ethylene bisdithiocarbamate. These materials are marketed generally as fungicides under the trade names Ferbam, Ziram, Captan, Thylate, Glyodin, Dithane M–22 and Manzate. Copper oxychloride is also useful as a fungicide in these formulations. Particularly useful for dipping banana fruit is a fungicide comprising a water-soluble powder containing as the active ingredient salicylanilide. This material is sold under the trade name Shirlan WS. An excellent dipping mixture is obtained by using 5–10% of the wax emulsion concentrate in water and adding to this solution with agitation 5–10 grams of Shirlan WS per liter of solution, the salicylanilide being found particularly effective in control of stem rot and is non-phytotoxic to the banana fruit. The mixture has excellent spreading ability, outstanding sticking characteristics, and is quick drying. The particular fungicide used and the amount may be varied considerably according to the use intended and the particular conditions encountered. For example, we have found that for spraying banana plants for sigatoka control, a 10% solution of our emulsion, the balance being water, containing 50–100 grams per liter of copper oxychloride is particularly effective. Under mild conditions, however, less fungicide may be used whereas severe attacks may require a stronger concentration.

EXAMPLE I

Formulations according to this invention have been extensively tested on banana plantations on the island of Martinique both as a spray on growing banana plants on the banana plantations and as a dip on fruit ready for shipment to market. At least ⅛ acre of banana plants at each test site was sprayed using knapsack sprayers with the test formulation and an adjacent ⅛ acre of banana plants was left untreated as a test or control plot. These tests showed markedly the ruin of the plants caused by sigatoka on the control plots and the excellent protection afforded by the test formulation on the adjacent plots. The wax emulsion used has the following formulation:

```
                                              Weight Percent
Paraffin scale wax, ASTM melting point 128° F.,
  oil content 1% _____ 22.25
Petrolatum, color amber, ASTM melting point
  120° F., penetration ASTM cone @ 77° F.,
  155–175 _____ 13.25
Microcrystalline wax, ASTM color <2, ASTM
  melting point 160° F., penetration ASTM needle
  @ 77° F., 22–32 _____    12
Condensation product of tertiary octyl phenol and
  5 mols of ethylene oxide (Triton X–45) _____     2
Condensation product of tertiary octyl phenol and
  ten mols of ethylene oxide (Triton X–100) ____     2
Water _____    48.5
```

The mixture was passed through a Manton-Gaulin homogenizer until the wax particle size was less than three microns. The mixture was then cut with additional water so that the emulsion as formulated above represented about 10% of the total blend. At one plantation about 40 grams per liter of copper oxychloride was added to the blend and then sprayed on the banana plants at the rate of 50 liters/hectare (5.6 gal./acre). The plants were resprayed every 14 days. The test was continued from July 1958 to April 1959 and at the conclusion the leaves were examined and the number of leaves completely free from sigatoka, burning or other damage were counted. This was also done in the adjacent control area where no treatment was given to the plants and also in an adjacent area treated only with oil containing about 17 grams/liter of copper oxychloride. The results were as follows:

|  | No. of Undamaged Leaves | Range, Maximum-Minimum |
|---|---|---|
| Wax emulsion plus 40 gr./liter of copper oxychloride | 6.50 | 9-5 |
| Oil plus 17 gr./liter of copper oxychloride | 6.50 | 7-3 |
| No treatment applied | 2.20 | 5.5-1.0 |

Since at least 4 undamaged leaves are required for the production of bananas, the untreated area was a total loss.

At a second plantation one area was sprayed with the wax emulsion formulation given above with 10 gr./liter of copper oxychloride, a second area was sprayed with the same wax emulsion formulation containing 20 gr./liter of copper oxychloride, a third area was sprayed with oil containing 17 gr./liter of copper oxychloride and a fourth area was left without treatment for control purposes. The results were as follows:

|  | No. of Undamaged Leaves | Range, Maximum-Minimum |
|---|---|---|
| Wax emulsion plus 10 gr./liter copper oxychloride | 7.275 | 12.0-2.5 |
| Wax emulsion plus 20 gr./liter copper oxychloride | 9.600 | 13.0-7.0 |
| Oil plus 17 gr./liter copper oxychloride | 6.8 | 9.5-3.5 |
| Untreated | 2.275 | 5-0 |

It is seen from the above Example 1 that 10 grams per liter of copper oxychloride in the wax emulsion represented the lower limit and 40 grams per liter of copper oxychloride represented the upper limit. The broad limits are about 10-40 grams/liter. Preferably the range of copper oxychloride addition should be about 15-25 grams/liter. It is seen that excellent results are obtained using 20 grams/liter of copper oxychloride.

The Bordeaux treatment, which was the only treatment available for many years, has now been abandoned in many areas, because of the expensive mixing and pumping system required. The treatment required 2000 liters of Bordeaux mixture per hectare, whereas with wax emulsion only 50 liters per hectare are required. The frequency of treatment depends largely upon the rapidity with which new leaves grow, being largely influenced by climate and the stage of tree development. The young plants develop new leaves rapidly whereas the older plants develop new leaves more slowly. Young plants, therefore, require retreatment about every 10-14 days, whereas the older plants can be controlled with respraying every three weeks.

In order to demonstrate the effectiveness of the wax emulsion of this invention as a dipping bath for controlling weight loss and maturation of the fruit, green bananas were obtained at the New York City market (estimated to have been two weeks in transit) and subjected to controlled laboratory test. The tests conducted were as follows:

EXAMPLE 2

Bunches of green bananas each containing five bananas were dipped in test emulsions A, B, C and D. Test B was the emulsion described in Example 1 cut back with water in the ratio 7.5 parts of emulsion to 92.5 parts of water. Test X involved untreated bananas as a test control. Tests C and D were emulsions modified slightly from B. The treated bananas were kept in a constant temperature room maintained at 70° F. and maintained at 50% relative humidity for 280 hours. The results in weight loss were as follows:

|  | Weight in Grams at Start | Weight in Grams at 46 Hours | Percent Loss in Weight 46 Hours | Weight in Grams at 112 Hours | Percent Loss in Weight 112 Hours | Weight in Grams at 160 Hours | Percent Loss in Weight 160 Hours | Weight in Grams at 208 Hours | Percent Loss in Weight 208 Hours | Weight in Grams at 280 Hours | Percent Loss in Weight 280 Hours |
|---|---|---|---|---|---|---|---|---|---|---|---|
| X | 503.7 | 468.6 | 7.0 | 441.1 | 12.4 | 424.1 | 15.8 | 407.3 | 19.1 | 384.1 | 23.7 |
| A | 526.3 | 500.4 | 4.9 | 481.7 | 8.5 | 470.1 | 10.6 | 459.4 | 12.7 | 443.7 | 15.7 |
| B | 707.0 | 679.5 | 3.9 | 659.2 | 6.8 | 646.4 | 8.6 | 634.1 | 10.3 | 617.0 | 12.7 |
| C | 513.6 | 491.5 | 4.2 | 474.4 | 7.6 | 463.8 | 9.7 | 453.3 | 11.7 | 437.3 | 14.8 |
| D | 787.4 | 755.1 | 4.1 | 728.0 | 7.6 | 710.0 | 9.8 | 692.1 | 12.1 | 667.5 | 15.2 |

Figure 2:
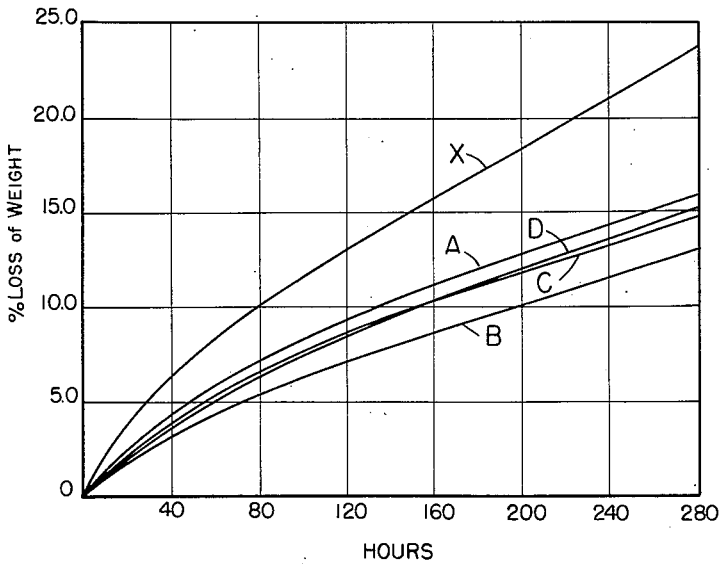
FIGURE 2 is a plot of percent weight loss in bananas versus hours under constant temperature and humidity conditions.

These results were plotted on FIGURE 2 and demonstrate strikingly the considerable improvement in weight loss to be obtained from the use of wax emulsion formulations. This of course means placing a greater weight of marketable product in the market. Emulsion D not only sharply reduced the weight loss, but also maintained the fruit in healthier form. The untreated bananas were rotten in their casings at the end of the test while those treated with emulsions C and D were still not quite ripe. Emulsion D provided the maximum retardation of ripening, yielded fruit free from disease, and did not spot or mar the skins of the bananas.

EXAMPLE 3

In order to get a comparison of dipping test results under variable climatic conditions, similar group of green bananas was dipped in the same emulsions A, B, C, and D as in Example 2. The treated bananas were located in a greenhouse for 280 hours where the temperature varied between 70 and 90° F. and no humidity control was provided. The results in weight loss were as follows:

|  | Weight in Grams at Start | Weight in Grams at 46 Hours | Percent Loss in Weight 46 Hours | Weight in Grams at 112 Hours | Percent Loss in Weight 112 Hours | Weight in Grams at 160 Hours | Percent Loss in Weight 160 Hours | Weight in Grams at 208 Hours | Percent Loss in Weight 208 Hours | Weight in Grams at 280 Hours | Percent Loss in Weight 280 Hours |
|---|---|---|---|---|---|---|---|---|---|---|---|
| X | 704.5 | 643.0 | 8.7 | 616.2 | 12.5 | 590.1 | 16.2 | 565.9 | 19.6 | 523.0 | 25.7 |
| A | 766.8 | 723.1 | 5.8 | 705.2 | 8.1 | 686.6 | 10.5 | 668.9 | 12.8 | 636.3 | 17.0 |
| B | 740.8 | 704.5 | 4.8 | 690.3 | 6.8 | 672.6 | 9.8 | 665.1 | 10.2 | 643.7 | 13.1 |
| C | 769.8 | 737.8 | 4.2 | 725.5 | 5.8 | 711.2 | 7.6 | 699.0 | 9.2 | 676.1 | 12.2 |
| D | 692.0 | 651.2 | 5.9 | 634.5 | 8.3 | 613.9 | 11.3 | 596.2 | 13.9 | 564.7 | 18.4 |

These results were plotted on FIGURE 1 and show the same general relationship as previously disclosed in Example 2. The emulsion dip provides a very substantial saving in weight loss. Emulsion D was found to provide the best control in retardation of ripening, uniform distribution of the emulsion with absence of spotting and best protection from disease damage. Sample A showed again non-uniform wetting of the emulsion with the formation of globules of water on the banana after dipping or accumulations of wax after drying. These heavy wax spots caused black spots to develop on the bananas during storage and hence this emulsion is not acceptable. Samples B, C and D, being variants of the emulsion of this invention, all showed the presence of a uniform film after dipping which dried rapidly to a thin film which could not be seen. This fruit, after ten days to twelve days, showed the best ripening conditions, being better than emulsion A and vastly superior to the untreated fruit. The untreated fruit rotted in the skins during this test whereas the emulsion-dipped fruit was still healthy at the end of the test.

During 1958 dipping experiments were made on bunches of freshly cut bananas on the island of Martinique and these tests confirmed the advantages to be obtained by treating the bananas prior to shipment.

EXAMPLE 4

This test involved dipping banana bunches in nine experimental wax emulsion blends. Two bunches were dipped in each test emulsion and two bunches were left untreated. The dipping composition was a mixture of 10% of the emulsion and 90% water. The best results in spreading and sticking were obtained when using the emulsion of this invention and furthermore this emulsion also demonstrated the least loss of weight. The banana bunches were weighed before dipping and again after 8 days' exposure to tropical climate. The bunches dipped in the preferred emulsion showed a loss of 4.54% and 4.95% whereas the untreated bunches showed a loss of 11.27% and 12.71%.

EXAMPLE 5

During 1958 on Martinique two identical series of tests were conducted with different concentrations of the preferred emulsion of this invention ranging from 2.5 to 40%. The bunches were dipped in the emulsions and the bunches were examined over a period of time for weight loss, freedom from disease and phytotoxicity. From the point of view of weight loss, the least loss occurred with the 40% concentration, being 3.27% and 4.39%. But at that concentration a small amount of phytotoxicity was manifested on the fruit. The best concentration without phytotoxicity was found to be the emulsion at a concentration of 7%. This sample showed a weight loss of 5.67% and 7.9% as compared to a weight loss of 10.14% and 15.66% for the untreated control bunches.

At the concentration of 5% the dehydration reached 8.56% and 12.12%. At the concentration of 10% some very light phytotoxicity effects commenced to be manifested. This test was conducted for a period of 8 days similar to Example 4.

It is seen that the concentrated emulsion must be diluted before application to the fruit or fruit tree and that the most effective dilution ratio is about 10% of wax emulsion concentrate to 90% water. A usable dilution range is about 5–10% wax emulsion concentrate to 90–95% water.

The examples given hereinabove are supplied to illustrate the invention without in any way limiting the scope of the invention. The only limitations intended are those found in the attached claims.

This case is a divisional application of case Serial No. 815,058, filed May 22, 1959.

We claim:

1. The method of treating tropical banana plants to prevent diseases which comprises: diluting a wax emulsion composition obtained by combining:

|  | Percent by weight |
|---|---|
| (a) A paraffin wax | 0–47.5 |
| (b) A microcrystalline wax | 0–47.5 |
| (c) A petrolatum | 0–25 |
| (d) An oil-soluble, non-ionic emulsifier | 0–5 |
| (e) A water-soluble, non-ionic emulsifier | 1–5 |
| (f) Water | Balance | said materials a–f being mixed in a high pressure homogenization treatment to reduce the wax particle size less than about 3 microns, thereby forming a stable wax emulsion, the total wax content of the emulsion being between about 10–70%, sufficient water being added during dilution to make said emulsion composition about 5–10% of the total solution, adding to the solution, with agitation, about 10–40 grams of fungicide per liter of total solution, spraying the solution onto the leaf area of the banana plant and repeating the spraying of solution onto the leaf of the banana plant at intervals required to maintain the plant free from diseases.

2. The method of treating banana plants to prevent sigatoka and other diseases which comprises diluting an emulsion formed by combining:

|  | Percent by weight |
|---|---|
| (a) A paraffin wax | 15–30 |
| (b) A microcrystalline wax | 5–20 |
| (c) A petrolatum | 10–15 |
| (d) An oil-soluble, non-ionic emulsifier | 1–3 |
| (e) A water-soluble, non-ionic emulsifier | 2–4 |
| (f) Water | Balance |

The total wax content being between 30–50% of the solution, said solution being mixed by high pressure homogenization to reduce the wax particle size to less than 3 microns and to uniformly disperse the wax, whereby a stable, permanent emulsion is formed, the amount of water added for dilution of said emulsion being sufficient to provide a finished solution in which said emulsion is 5–10% by weight of the total, adding to the finished solution, with agitation, about 10–40 grams of copper oxychloride for each liter of finished solution, spraying the finished solution onto the banana plants at the rate 50 liters per hectare of plants and repeating this spraying of the plants at the same rate about every fourteen days, whereby sigatoka and other diseases are prevented.

3. The method of maintaining bananas healthy during transit to distant markets while reducing weight loss in transit and retarding maturation of the bananas which comprises forming the dipping solution of about 90–95% water and about 5–10% of an emulsified solution obtained by combining:

|  | Percent by weight |
|---|---|
| (a) A paraffin wax | 15–30 |
| (b) A microcrystalline wax | 5–20 |
| (c) A petrolatum | 10–15 |
| (d) A polyoxyethylene ether of t-octyl phenol having about 5 mols of ethylene oxide per mol of finished product | 1–3 |
| (e) A polyoxyethylene ether of t-octyl phenol having about 10 mols of ethylene oxide per mol of finished product | 2–4 |
| (f) Water | Balance |

The total wax content being between 30–50% of said emulsified solution, said emulsified solution being mixed by high pressure homogenization to reduce the wax particle size to less than 3 microns and to uniformly disperse the wax, whereby said solution is provided in the form of a stable, permanent emulsion, adding to the diluted final solution, with agitation, about 5–100 grams of fungicide per liter of finished solution, dipping the bananas completely in the treating solution, draining excess liquid from the bananas, and transferring the bananas to market in their treated form, whereby disease is prevented, moisture evaporation loss is retarded and maturation of the bananas controlled.

4. The method of protecting bunches of bananas during transit from the tropics to temperate markets which comprises forming a dipping solution by commingling 90–95% of water with 5–10% of an emulsion obtained by combining:

|  | Percent by weight |
|---|---|
| (a) Paraffin scale wax, ASTM melting point 128° F., oil content 1% | 22.25 |
| (b) Petrolatum, color amber, ASTM melting point 120° F., penetration ASTM cone @ 77° F., 155–175° F. | 13.25 |
| (c) Microcrystalline wax, ASTM color <2, ASTM melting point 160° F., penetration ASTM needle @ 77° F., 22–32 | 12 |
| (d) Condensation product of tertiary octyl phenol and 5 mol of ethylene oxide | 2 |
| (e) Condensation product of tertiary octyl phenol and 10 mol. of ethylene oxide | 2 |
| (f) Water | 48.5 |

Said emulsion being in the form of a stable wax emulsion with a wax particle size of less than 3 microns, commingling about 5–10 grams of salicylanilide powder with each liter of the dipping solution, submerging the bunches of bananas completely in the dipping solution, draining the bunches of bananas after dipping, drying the bunches of bananas to form thereby a thin protective wax coating on the bananas and shipping the protected bananas to market whereby the bananas are maintained in healthy form, the maturation of the bananas is retarded and the evaporation loss of the bananas during transit is substantially reduced.

5. The method of maintaining banana plants and their fruit healthy, which comprises diluting a composition obtained by commingling 10–70% by weight hydrocarbon wax, 0–5.0% by weight oil-soluble non-ionic emulsifier, 1–5% by weight water-soluble non-ionic emulsifier, balance to 100% by weight water, the wax being present in the composition in finely divided homogenized form as a highly stable wax emulsion, with enough added water to provide a diluted emulsion in which the original composition amounts to about 5–10% by weight of the finished blend, adding to the mixture with agitation about 5–100 grams per liter of a fungicide, applying the diluted wax emulsion formed thereby to the banana plants and their fruit to apply a thin medicinal coating of smooth-spraying, firm-sticking, rapid-drying wax adapted to protect the coated banana plant and fruit from damage.

References Cited in the file of this patent

UNITED STATES PATENTS

| | | |
|---|---|---|
| 1,943,468 | Bridgeman et al. | Jan. 16, 1934 |
| 2,186,691 | Belzer | Jan. 9, 1940 |
| 2,196,164 | Trowbridge et al. | Apr. 2, 1940 |
| 2,703,288 | Worson | Mar. 1, 1955 |
| 2,780,554 | Lerner | Feb. 5, 1957 |
| 2,782,124 | Von Rosenberg et al. | Feb. 19, 1957 |